United States Patent
Seitz et al.

(10) Patent No.: US 10,921,448 B2
(45) Date of Patent: Feb. 16, 2021

(54) OPTICAL DISTANCE MEASURING SYSTEM

(71) Applicant: HAMAMATSU PHOTONICS K.K., Hamamatsu (JP)

(72) Inventors: Peter Seitz, Urdorf (CH); Alexandru Rusu, Lausanne (CH)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 333 days.

(21) Appl. No.: 15/760,253

(22) PCT Filed: Sep. 18, 2015

(86) PCT No.: PCT/JP2015/004812
§ 371 (c)(1),
(2) Date: Mar. 15, 2018

(87) PCT Pub. No.: WO2017/046832
PCT Pub. Date: Mar. 23, 2017

(65) Prior Publication Data
US 2020/0233082 A1    Jul. 23, 2020

(51) Int. Cl.
*G01C 3/08* (2006.01)
*G01S 17/08* (2006.01)
(Continued)

(52) U.S. Cl.
CPC ............ *G01S 17/08* (2013.01); *G01B 11/272* (2013.01); *G01C 15/008* (2013.01); *G01S 17/48* (2013.01)

(58) Field of Classification Search
CPC ....... G01S 17/08; G01S 17/48; G01B 11/272; G01C 15/008
See application file for complete search history.

(56) References Cited

U.S. PATENT DOCUMENTS 3,814,945 A * 6/1974 Allnutt ............... G01N 21/8901
   250/559.49
3,940,203 A * 2/1976 La Russa ............. G02B 5/3083
   359/15

(Continued)

FOREIGN PATENT DOCUMENTS

DE    42 11 875 A1    10/1993
DE    197 52 145 A1    5/1999
(Continued)

OTHER PUBLICATIONS

International Search Report/Written Opinion dated May 24, 2016 for PCT/JP2015/004812.
(Continued)

*Primary Examiner* — Samantha K Abraham
(74) *Attorney, Agent, or Firm* — Faegre Drinker Biddle & Reath LLP

(57) ABSTRACT

An optical system for measuring a distance to an object furnished with a plane mirror is disclosed. The optical distance measuring system includes a coherent light source projecting a laser beam, optical elements, and a one-dimensional photosensor. The optical elements split the laser beam into two laser beams and spread out the laser beam into a sheet of light whose orientation is perpendicular to a plane created by the propagation directions of the laser beams. The laser beams are reflected by the mirror and back to the photosensor. The photosensor detects incident light intensity distribution of the reflected laser beams with two local maxima, whose position can be employed to calculate the distance of the mirror and its momentary tilt angle.

9 Claims, 5 Drawing Sheets

(51) Int. Cl.
*G01B 11/27* (2006.01)
*G01C 15/00* (2006.01)
*G01S 17/48* (2006.01)

(56) References Cited

U.S. PATENT DOCUMENTS

| | | | |
|---|---|---|---|
| 5,424,834 | A | 6/1995 | Akedo et al. |
| 5,561,524 | A * | 10/1996 | Yamasaki ........... G03F 7/70716 356/493 |
| 5,579,108 | A * | 11/1996 | See ................... G01B 11/26 356/450 |
| 6,476,944 | B1 * | 11/2002 | La Russa ............... G02B 5/32 359/1 |
| 2005/0099663 | A1 * | 5/2005 | Hayashi .............. G02B 26/123 359/204.1 |
| 2008/0174785 | A1 * | 7/2008 | Seitz .................. G01B 11/2441 356/516 |
| 2008/0212103 | A1 * | 9/2008 | Walmsley ............... G04F 13/02 356/450 |
| 2008/0273211 | A1 | 11/2008 | Schmitt et al. |
| 2011/0058167 | A1 * | 3/2011 | Knox ..................... G01N 15/06 356/338 |
| 2015/0019160 | A1 | 1/2015 | Thurner et al. |
| 2015/0192767 | A1 * | 7/2015 | Li ......................... G02B 21/18 348/79 |
| 2015/0205087 | A1 * | 7/2015 | Schumann ......... G02B 21/0032 359/386 |

FOREIGN PATENT DOCUMENTS

| | | |
|---|---|---|
| DE | 10 2005 058 873 A1 | 6/2007 |
| EP | 1 067 362 A1 | 1/2001 |
| EP | 2 482 094 A1 | 8/2012 |
| JP | 2003-504947 | 2/2003 |
| JP | 2011-242176 A | 12/2011 |
| WO | WO 01/004571 A1 | 1/2001 |
| WO | WO-2011/142462 A1 | 11/2011 |

OTHER PUBLICATIONS

Peter Seitz, "Optical superresolution using solid-state cameras and digital signal processing", Optical Engineering, Jul. 1988, vol. 27, No. 7, pp. 535-540.

* cited by examiner

OPTICAL DISTANCE MEASURING SYSTEM

TECHNICAL FIELD

The present invention relates to an optical system and a method for measuring the distance to an object furnished with a plane mirror. The tilt angle of the mirror is not precisely known, and it can change with time. In particular, the invention relates to an optical distance measuring system where the mirror is moving over distances much larger than the size of the mirror, as is the case for example in tubular systems, where the distance of a moving piston muse be measured.

BACKGROUND ART

Measuring the distance to an object without making physical contact to the object is a frequently encountered problem in many mechanical systems. Very often, the preferred solution to such a problem is an optical method, in which light from a suitable light source is shining on the object, from where it is reflected back to the measurement system. There it is detected by a photo-sensor, and the electronic signal of the photosensor is processed to obtain the desired distance information. The Patent Literatures 1 to 4 disclose examples of the optical method.

CITATION LIST

Patent Literature

PTL 1: European Patent No. EP 2,482,094
PTL 2: US Patent Application Publication No. 2015/0019160 A1
PTL 3: U.S. Pat. No. 5,424,834
PTL 4: German Patent No. DE 42,11,875

SUMMARY OF INVENTION

Technical Problem

A situation often encountered in practice is that the distance variations to be measured are much larger than the space available to either side of the light path. As a consequence, it is necessary to employ an optical measurement method working in proximity of the optical axis. Three fundamentally different optical measurement methods are known to solve the problem:

(1) Optical time-of-flight methods, as described for example by S. Mack in European Patent No. EP 2,482,094A1 "Eutfernungsmessender optoelektronischer Sensor and Verfahren zur Objekterfassung". The practical advantage of time-of-flight methods is that their maximum measurement distance is almost unlimited, and even the distance to the moon has been measured with such a method. However, because of the large speed of light of about $3 \times 10^8$ m/s, the distance accuracy achievable today with time-of-flight methods is of the order of 1 mm, which is insufficient for many mechanical systems.

(2) Interferometric methods, making use of the small wavelength of coherent light available from cost-effective laser diodes in the range of 200 to 2000 nm. Therefore, the measurement precision of interferometric methods is well below 100 nm, which is sufficient for most mechanical systems. However, conventional interferometric distance measurement methods cannot determine absolute distances because they suffer from the well-known phase ambiguity problem encountered in monochromatic interferometry systems. This can be overcome with multiple-wavelength interferometers, as described for example by K. Thurner et al. in US Patent Application No. 2015/0019160 A1, "Absolute distance laser interferometer". The complexity of such a distance measurement system makes it expensive to build and to stabilize during operation. An additional practical problem is that interferometric distance measuring methods are highly sensitive to the tilt of the mirror. A deviation of the mirror orientation as small as 0.1 degrees from the ideal 90 degrees with respect to the optical axis can change the interference pattern substantially, i.e. change bright fields into dark fields.

(3) These disadvantages can be overcome with triangulation methods, making use of an optical system with two different optical axes: In stereo triangulation systems, an identical spot on the object is observed from two different directions. In active triangulation systems, structured light is incident along one direction, and its image on the object under study is observed from another direction. An example of such a triangulation system is described by J. Akedo et al. in U.S. Pat. No. 5,424,834, "Optical displacement sensor for measurement of shape and coarseness of a target workpiece surface". This triangulation method requires at least three optical lens systems for creating a light spot on the object under study and for focusing the back-reflected light onto the photosensors. The system complexity can be reduced by utilizing only two optical lens systems, one for creating a measurement light beam, and one for creating and imaging a light spot on the object under study, as described for example in German Patent No. DE42,11,875A1, "Optischer Abstandssensor". By making use of two independent photosensors, it is possible to measure simultaneously the absolute distance to the object and the local tilt of the object surface where the measurement spot is created.

Solution to Problem

According to one aspect of the present invention, an optical system for measuring a distance to an object furnished with a plane mirror may comprise a coherent light source projecting a laser beam toward the plane mirror along an optical axis, an optical element arranged on the optical axis, the optical element splitting the incident laser beam into two laser beams whose propagation directions are at a given angle between each other and spreading out the incident laser beam into a sheet of light whose orientation is perpendicular to a plane created by the propagation directions of the two laser beams, and a one-dimensional photosensor configured to detect an incident light intensity distribution. The split two laser beams are propagating from the optical element to the plane mirror and the two laser beams reflected by the plane mirror are propagating to the one-dimensional photosensor. The one-dimensional photosensor detects the incident light intensity distribution of the reflected two laser beams with two local maxima, whose position can be employed to calculate the distance of the plane mirror and its momentary tilt angle.

According to one aspect of the present invention, the optical element may be placed on top of the one-dimensional photodetector.

According to one aspect of the present invention, the optical element may be a cylindrical lens made of a transparent material.

According to one aspect of the present invention, the optical element may have a flat input face and an exit face consisting of two flat planes at an angle to each other. The flat input face may have a plane entrance face provided with an anti-reflection coating and a plane reflecting face, provided with a mirror coating. A first flat plane face of the exit face may be provided with a reflection coating and a second flat plane face of the exit face may be provided with an anti-reflection coating. The laser beam from the coherent light source may be incident at the plane entrance face and be propagating to the first flat plane face of the exit face, one part of the incident laser beam may be propagating out from the first flat plane face along a first direction and the other part of the incident laser beam may be reflected by the first flat plane face toward the plane reflecting face of the flat input face, and the other part of the incident laser beam may be reflected at the plane reflecting face and may be propagating out from the second flat plane face of the exit face along a second direction.

According to one aspect of the present invention, the photosensor may consist of a one-dimensional arrangement of pixels fabricated as an array of photodiodes or a CCD line. The shape of the pixels may be rectangular.

Advantageous Effects of Invention

The described complexity and measurement accuracy limitations of known optical distance measurement methods can be overcome by the system according to the present invention described above, implementing a particularly simple, robust and compact optical triangulation method: The distance to an object furnished with a plane mirror is measured without the need for any optical lens system, neither for focusing incident light on the mirror nor for creating an image of the reflected light onto the photo sensor. Additionally, two major parameters are measured simultaneously, namely the distance of the mirror and the tile angle of the mirror.

BRIEF DESCRIPTION OF DRAWINGS

The invention will be better understood and objects other than those set forth above will become apparent when consideration is given to the following detailed description thereof. Such description makes reference to the annexed drawings, wherein.

DESCRIPTION OF EMBODIMENTS

It is a principle object of one embodiment of the present invention to provide an optical system and method for measuring a distance to an object furnished with a plane mirror.

A further object of one embodiment of the present invention is to provide an optical distance measuring system that can be implemented without optical imaging lens systems so that the realized system becomes simple, robust, compact and cost-effective.

Another object of one embodiment of the present invention is to provide an optical distance measuring system that can accept a tilt angle of the plane mirror. This is accomplished by measuring the distance and the tilt angle of the plane mirror simultaneously.

Yet another object of one embodiment of the present invention is to provide an optical distance measuring system that can be implemented with a small lateral extent to all sides of the optical axis. In this way, the distance of a piston-like object furnished with a plane mirror, which is travelling in a cylinder, can be measured with this optical distance measuring system implemented in tubular form.

Figure 1:
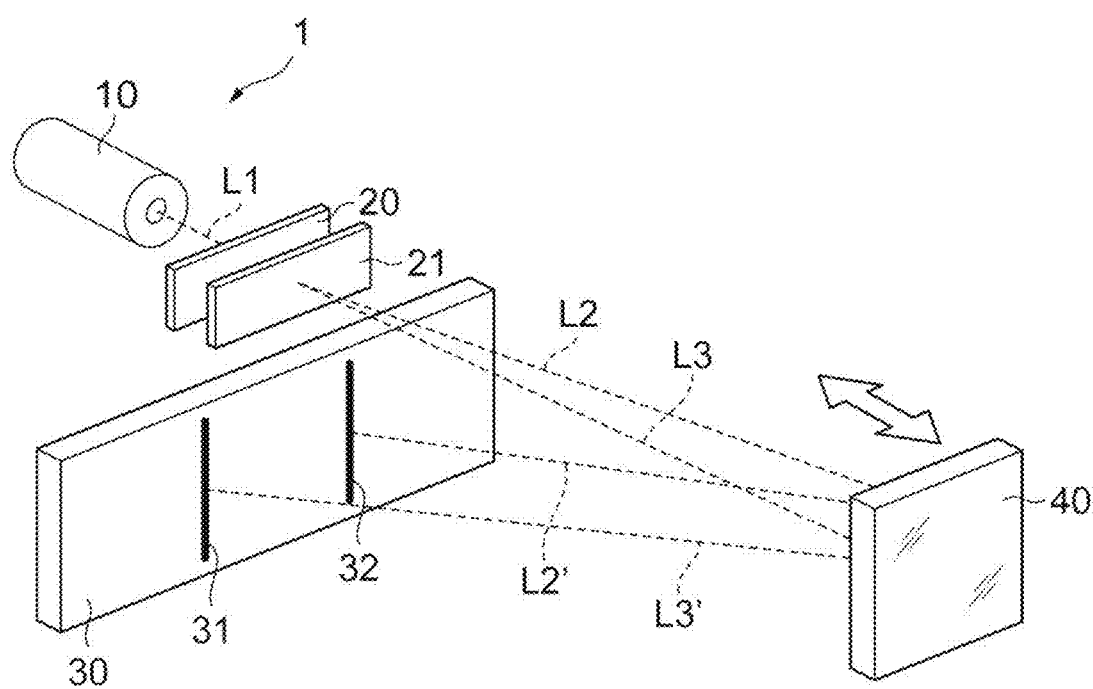
FIG. 1 shows a perspective view of an optical system according to an embodiment of the present invention.
Figure 2:
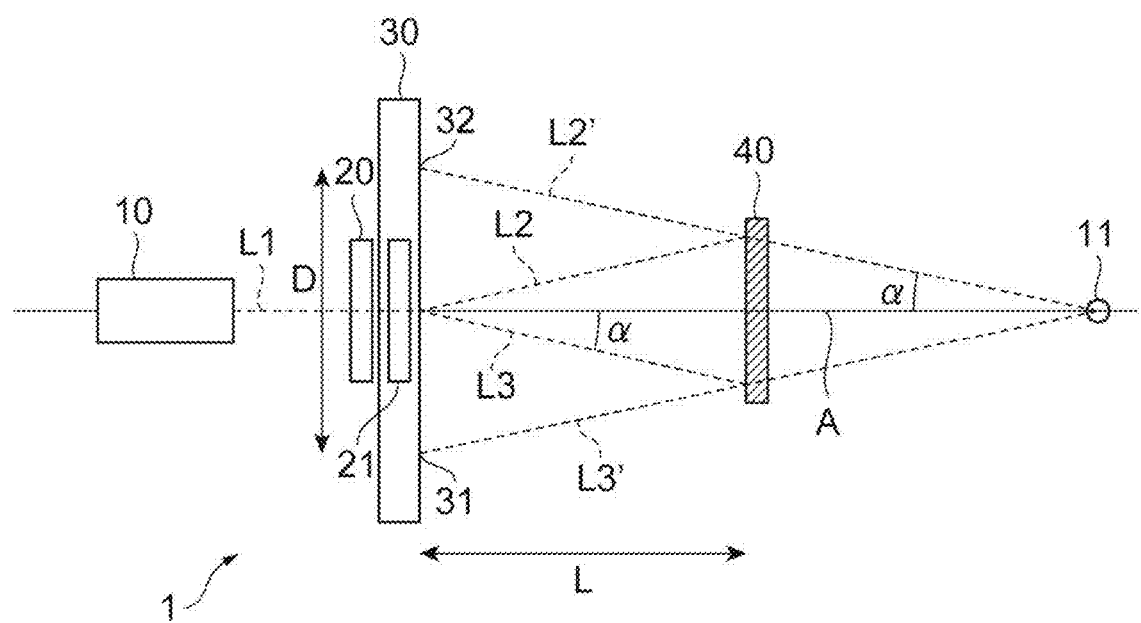
FIG. 2 shows a top view of the optical system illustrated in FIG. 1.

With the foregoing objects in view, one embodiment of the present invention is achieved with an optical system illustrated in FIGS. 1 and 2. As illustrated in FIGS. 1 and 2, an optical distance measuring system 1 includes a coherent light source 10 (laser source), one or two optical elements 20 and 21 in front of the coherent light source 10, and a one-dimensional photosensor 30. The optical distance measuring system 1 can calculate an absolute distance L to an object furnished with a plane mirror 40 from the one-dimensional photosensor 30. In order to simplify the explanation of the system 1, the plane mirror 40 without the object is illustrated in the drawings. In FIGS. 1 and 2, the plane mirror 40 is arranged at 90 degrees to an optical axis A and the one-dimensional photosensor 30 can determine the absolute positions of the two light sheets L2' and L3'.

Figure 4:
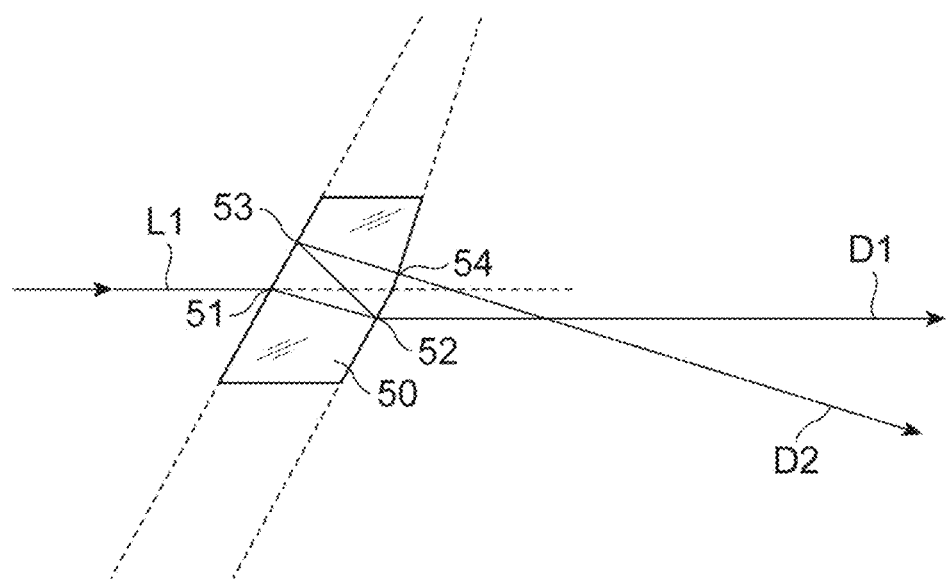
FIG. 4 shows a top view of an embodiment of a first optical function required to split an incident laser beam into two beams at an angle to each other.

The coherent light source 10 emits thin laser beam L1, which is modified by the optical elements 20 and 21. One optical element 21 or 22 splits an incoming laser beam L1 into two beams L2 and L3 at an angle α to each other. A preferred embodiment of such an optical element is illustrated in FIG. 4. The other optical element 21 or 22 spreads out one or more incident laser beams in a direction vertical to the propagation direction. A preferred embodiment of such an optical element is a cylindrical lens made of a transparent material such as glass or plastics. As long as the optical devices 20 and 21 are physically close to each other, their order is of no practical importance. It is also possible to combine the two optical functions implemented with optical elements 20 and 21 into one single optical element. In any case, the direction of spreading out incoming laser beam L1 into light sheets L2 and L3 must be perpendicular to the plane created by the propagation directions of the split laser beams L2 and L3.

Figure 3:
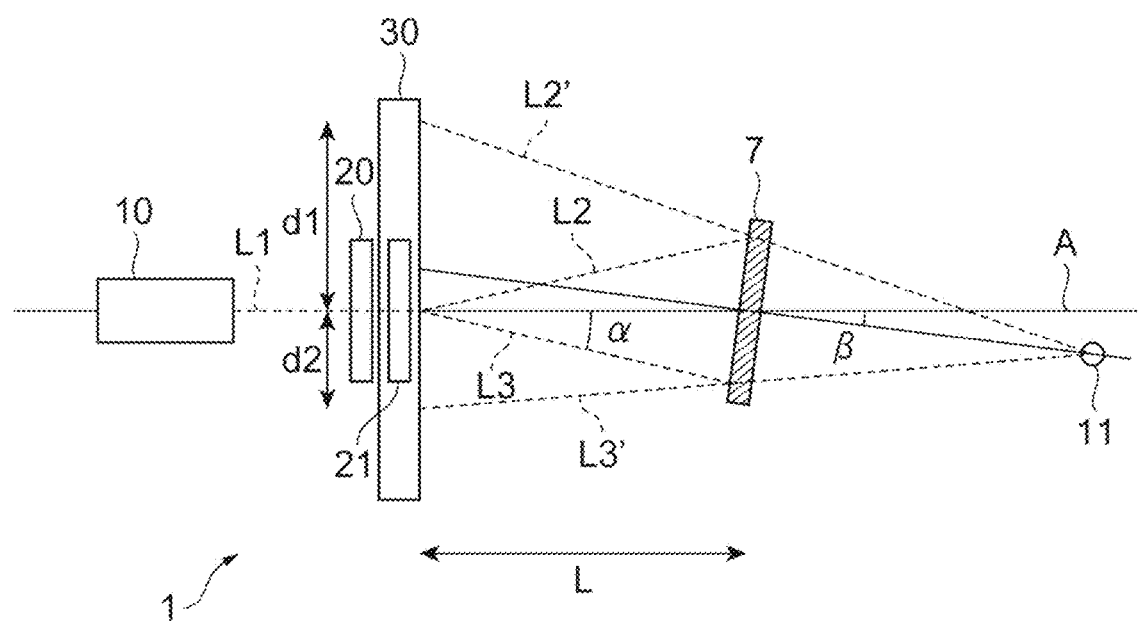
FIG. 3 shows another top view of a situation where a reflecting mirror is found at an angle β to the ideal 90 degrees orientation with respect to an optical axis.

The light sheets L2 and L3 are reflected back by the plane mirror 40, which can move on the optical axis and whose distance with respect to the optical detector system 30 must be determined. The reflected light sheets L2' and L3' are incident on the one-dimensional photosensor 30 and are detected at positions 31 and 32. The measured two positions 31 and 32 are then employed to calculate the absolute distance L of the plane mirror 40 to the optical detector system 30, as illustrated in FIGS. 2 and 3. The FIGS. 2 and 3 show the optical paths of the two light sheets L2 and L3 and the construction of the virtual light source 11 for calculating the absolute distance L of the plane mirror 40 making use of the positions of the two light sheets L2' and L3' on the one-dimensional photosensor 30.

FIG. 2 illustrates the optical construction used to calculate the distance L of the plane mirror 40 from the optical detector system 30. It is assumed that the optical beam splitter 21 (or 20) is placed exactly on top of the photosensitive surface of the one-dimensional photosensor 30. The beam splitter 21 creates two sheets of light L2 and L3 propagating in two different directions separated by the angle 2α. In case the reflecting mirror 40 is placed at the ideal angle of 90 degrees to the optical axis A, a virtual point 11 is created on the optical axis A, corresponding to the point where the beam splitter 21 creates the light sheets L2 and L3. The distance between the virtual point 11 and emission/detection location (photosensor 30) on the optical axis A is given by 2L. In this symmetrical case, the light sheets L2' and L3' are detected at symmetrical locations 31 and 32 by the one-dimensional photosensor 30. The measured distance D between the locations 31 and 32 and the known angle 2α between the two emitted light sheets L2 and L3 can be used to calculate the distance L of the plane mirror 40 according to $L=D/(4 \tan(\alpha))$.

In practice, it is often not possible to ensure that the mirror 40 is oriented at the ideal 90 degrees with respect to the optical axis A, and this tilt angle of the mirror 40 can change with time. In the optical system according to one embodiment of this invention, this situation is resolved by employing absolute locations d1 and d2 where the reflected light sheets L2' and L3' are detected by the one-dimensional photosensor 30, as illustrated in FIG. 3. In case the tilt angle β of the mirror 40 is not equal to zero degrees, the detected locations d1 and d2 are also not equal, and their values can be employed together with precise knowledge of the triangulation angle α to calculate the distance L and the mirror tilt angle β, which are both trigonometric functions of the other parameters, i.e. L (α, d1, d2) and β (α, d1, d2)

A key component in the optical distance measurement system 10 according to one embodiment of the present invention is one of the optical components 21 or 22, capable of splitting the incoming laser beam L1 into the two propagating laser beams L2 and L3, with angle 2α between their propagation directions. A first preferred embodiment of such an optical component is a sinusoidal phase grating with a (peak-to-peak) modulation depth of $n\lambda/2$ and a grating period of $\lambda/\tan(\alpha)$, where n indicates the index of refraction of the grating material and λ is the wavelength of the laser light. It is known that the wavelength of a laser diode is changing as a function of temperature, and as a consequence, the triangulation angle 2α is also changing as a function of the laser diode's temperature. If these temperature variations cannot be kept reasonably low, a second preferred embodiment of the beam-splitting component is illustrated in FIG. 4, where the triangulation angle 2α depends only weakly on the wavelength of the laser light. The beam splitter consists of an optically transparent component 50, which consists of a piece of optically transparent material with one flat input face, whose lower part is transparent and whose upper part is made reflective, and with an exit face consisting of two flat planes at a small angle to each other, one of which is half-silvered, and the other is transparent. In this transparent component 50, the incident laser beam L1 is incident at an angle on a plane entrance face 51 which is provided with a suitable anti-reflection coating. Inside the component 50, the laser beam L1 is propagating to a plane face 52 which is provided with a 50% reflection coating, so that one part of the laser beam L1 is propagating out of the component 50 along a first direction D1, and the other part of the laser beam L1 is reflected to a plane face 53 which is provided with a mirror coating. The second laser beam is reflected at the plane face 53, from where it is propagating to a plane face 54 which is provided with a suitable anti-reflection coating. The second laser beam is propagating out of component 50 into direction D2, such that the angle between the directions D1 and D2 is equal to the triangulation angle 2α. This triangulation angle is different from zero if at least one of the plane faces 51, 52, 53 and 54 is oriented at an angle to the other plane faces.

In another embodiment of the present invention, the optical elements 20 and 21 contain a function with which the two laser beams can be switched on and off independently. In this way, the photosensor 30 needs to detect only one laser beam position at a time because a first measurement is carried out with only the first laser beam switched on (while the second laser beam is switched off), followed by a second measurement with the second laser beam switched on (while the first laser beam is switched off). This time-sequential measurement allows for the use of additional types of one-dimensional photosensors, such as for example a PSD (Position Sensitive Device). A simple alternative to realize such an embodiment is to employ two independent laser sources emitting their laser beams at the triangulation angle 2α to each other, and in front of each laser source, a light-sheet forming optical element is placed.

The one-dimensional photosensor 30 senses the light distribution created by the incident light sheets L2' and L3' at positions 31 and 32. A preferred embodiment of the photosensor 30 consists of a one-dimensional arrangement of pixels fabricated for example as a photodiode array or a CCD (charge-coupled device) line. Since the use of the laser beams will result in speckle patterns on the photodetector, it is advantageous if the pixel shape is rectangular, with the long side parallel to the direction of the light sheets L2' and L3', so that the influence of such speckle patterns is reduced by spatial averaging.

Figure 5:
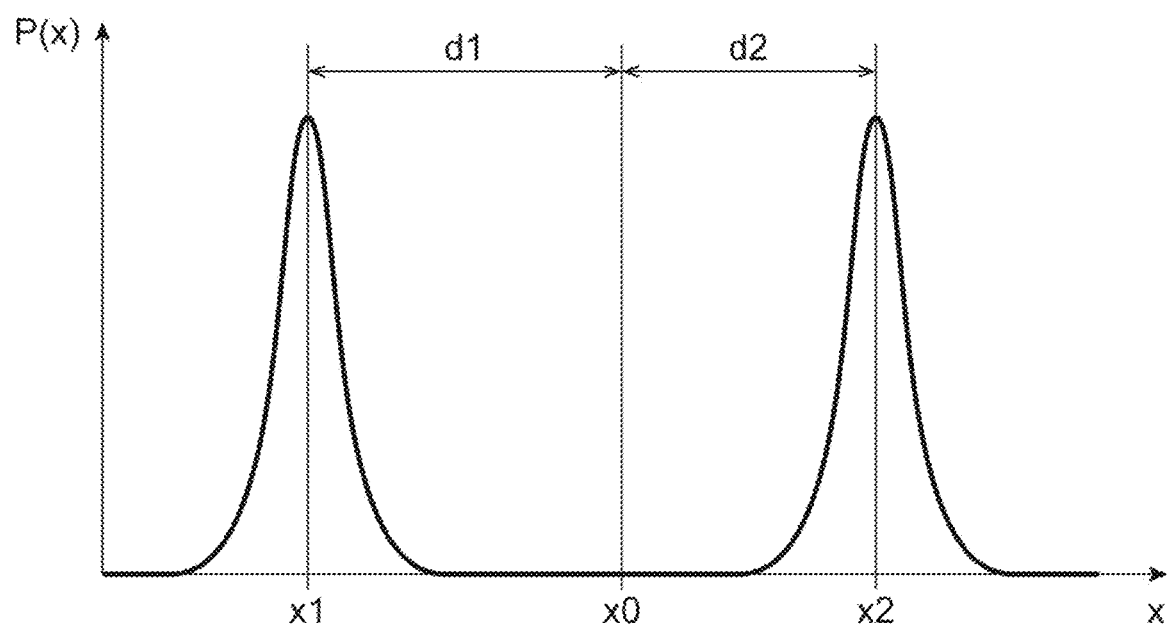
FIG. 5 shows the incident light intensity distribution P(x) as a function of the lateral position x on a one-dimensional photosensor

The photosensor 30 detects a light distribution as schematically illustrated in FIG. 5. The photodetector signal P(x) as a function of lateral position x exhibits two local maxima at positions x1 and x2, which can be determined with known signal processing algorithms. As an example, an algorithm with which the local maximum of a one-dimensional light intensity distribution P(x) can be determined with an accuracy of better that 1% of the pixel period has been described by P. Seitz in "Optical super-resolution using solid-state cameras and digital signal processing", Optical Engineering Vol. 27, No. 5, pp. 535-540, July 1988.

In this way, the positions x1 and x2 of the two maxima of P(x) can be determined with high precision. This information is then used, together with the knowledge of the position x0 of the optical axis A with respect to the photosensor 30, to calculate d1=x0−x1 and d2=x2−x0, Since the distance L (α, d1, d2) and the mirror tilt angle β (α, d1, d2) are both functions of the two parameters d1 and d2 as well as angle α, the value of L and β can be calculated with this knowledge.

As a practical example for the performance of the optical distance measurement system 1 according to one embodiment of the present invention, consider an angle α of 2 degrees and a photodetector array with a pixel period of 5 μm. Assuming that the precision with which the positions x1 and x2 of the two maxima of P(x) can be determined is 1% of the pixel period, the distance D=x2−x1 can be determined with a precision $\Delta D=\sqrt{2}\times 50$ nm, which is approximately equal to 70.7 nm. In case the mirror tilt angle is zero, corresponding to the symmetrical case illustrated in FIG. 2, the precision ΔL with which the distance L can be measured is given by $\Delta L=\Delta D/(4 \tan(\alpha))$, which is approximately equal to 0.51 μm.

Assuming that the photodetector array consists of 2048 pixels, the total length of the sensor line and therefore also the maximum value of D is 10.24 mm. As a consequence, the maximum distance L that can be measured in this configuration is given by $L_{max}$, which is approximately equal to 70 mm. This example illustrates the compactness with which the optical distance measuring device according to one embodiment of the present invention can be realized; in the examined example it only requires a tubular space of a diameter of at least 10.24 mm and resulting in a useful measurement length of about 70 mm, provided that the tilt angle of the plane mirror is zero.

REFERENCE SIGNS LIST

1 . . . optical distance measuring system, 10 . . . coherent light source, 20, 21 . . . optical element, 30 . . . one-dimensional photosensor, 31, 32 . . . position, 40 . . . plane mirror, 50 . . . component, 51, 52, 53, 54 . . . plane face, L1 . . . laser beam, L2, L3, L2', L3' . . . light sheet.

The invention claimed is:

1. An optical system for measuring a distance to an object furnished with a plane mirror, comprising:
   a coherent light source projecting a laser beam toward the plane mirror along an optical axis;
   an optical element arranged on the optical axis, the optical element splitting the incident laser beam into two laser beams whose propagation directions are at a given angle between each other and spreading out the incident laser beam into a sheet of light whose orientation is perpendicular to a plane created by the propagation directions of the two laser beams; and
   a one-dimensional photosensor configured to detect an incident light intensity distribution,
   wherein the split two laser beams are propagating from the optical element to the plane mirror and the two laser beams reflected by the plane mirror are propagating to the one-dimensional photosensor, and
   wherein the one-dimensional photosensor detects the incident light intensity distribution of the reflected two laser beams with two local maxima, whose position can be employed to calculate the distance of the plane mirror and its momentary tilt angle.

2. The optical system according to claim 1, wherein the optical element is placed above the one-dimensional photosensor.

3. The optical system according to claim 1, wherein the optical element is a cylindrical lens made of a transparent material.

4. The optical system according to claim 1, wherein the optical element has a flat input face and an exit face consisting of two flat planes at an angle to each other.

5. The optical system according to claim 4,
   wherein the flat input face has a plane entrance face provided with an anti-reflection coating and a plane reflecting face provided with a mirror coating,
   wherein a first flat plane face of the exit face is provided with a reflection coating and a second flat plane face of the exit face is provided with an anti-reflection coating, and
   wherein the laser beam from the coherent light source is incident at the plane entrance face and is propagating to the first flat plane face of the exit face, one part of the incident laser beam is propagating out from the first flat plane face along a first direction and the other part of the incident laser beam is reflected by the first flat plane face toward the plane reflecting face of the flat input face, and the other part of the incident laser beam is reflected at the plane reflecting face and is propagating out from the second flat plane face of the exit face along a second direction.

6. The optical system according to claim 1, wherein the photosensor consists of a one-dimensional arrangement of pixels fabricated as a photodiode array or a CCD line.

7. The optical system according to claim 6, wherein the shape of the pixels is rectangular.

8. The optical system according to claim 1, wherein the optical element switches the two laser beams on and off independently.

9. An optical system for measuring a distance to an object furnished with a plane mirror, comprising:
   two coherent light sources each projecting a laser beam toward the plane mirror along an optical axis;
   an optical element arranged on the two optical axes, the optical element spreading out the incident laser beam into a sheet of light whose orientation is perpendicular to a plane created by propagation directions of the two laser beams; and
   a one-dimensional photosensor configured to detect an incident light intensity distribution,
   wherein the two laser beams are propagating from the optical element to the plane mirror and the two laser beams reflected by the plane mirror are propagating to the one-dimensional photosensor, and
   wherein the one-dimensional photosensor detects the incident light intensity distribution of the reflected two laser beams with two local maxima, whose position can be employed to calculate the distance of the plane mirror and its momentary tilt angle.

* * * * *